United States Patent
Watanabe

(10) Patent No.: US 10,614,566 B2
(45) Date of Patent: Apr. 7, 2020

(54) INSPECTION CONDITION DETERMINATION DEVICE, INSPECTION CONDITION DETERMINATION METHOD, AND INSPECTION CONDITION DETERMINATION PROGRAM

(71) Applicant: FANUC CORPORATION, Minamitsuru-gun, Yamanashi (JP)

(72) Inventor: Keisuke Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/797,410

(22) Filed: Oct. 30, 2017

(65) Prior Publication Data
US 2018/0122064 A1    May 3, 2018

(30) Foreign Application Priority Data
Nov. 2, 2016   (JP) ................... 2016-215271

(51) Int. Cl.
G06K 9/00        (2006.01)
G06T 7/00        (2017.01)
(Continued)

(52) U.S. Cl.
CPC ........... G06T 7/0008 (2013.01); G01N 21/88 (2013.01); G01N 21/8803 (2013.01);
(Continued)

(58) Field of Classification Search
CPC ... G06T 7/0002; G06T 7/0004; G06T 7/0008; G06T 7/001; G06T 7/70; G06T 11/00;
(Continued)

(56) References Cited

U.S. PATENT DOCUMENTS 7,142,294 B2 * 11/2006 Shibata ............. G01N 21/9501
                                                    382/149
7,676,077 B2 *  3/2010 Kulkarni ............. G06F 17/5045
                                                    382/144
(Continued)

FOREIGN PATENT DOCUMENTS

CN        102308201       1/2012
CN        104502527       4/2015
(Continued)

OTHER PUBLICATIONS

Notification of Reasons for Refusal dated Feb. 20, 2018 in corresponding Japanese Application No. 2016-215271 (with English translation).
(Continued)

*Primary Examiner* — Eric Rush
(74) *Attorney, Agent, or Firm* — Wenderoth, Lind & Ponack L.L.P.

(57) ABSTRACT

An inspection condition determination device comprises: an addition unit that adds data mimicking a flaw assumed to occur in an inspection target to a designated position of a three-dimensional model of the inspection target; a generation unit that generates an image without a flaw by replicating an optical condition for capturing an image of the inspection target on the three-dimensional model, and an image with the flaw by replicating the optical condition on the three-dimensional model to which the data mimicking the flaw is added; a determination unit that determines whether or not a difference between the image without a flaw and the image with the flaw at the designated position exceeds a threshold that allows detection of the flaw in the inspection target; and an extraction unit that extracts an optical condition available for detecting flaws of multiple designated patterns from multiple optical conditions.

10 Claims, 4 Drawing Sheets

(51) Int. Cl.
*G01N 21/88* (2006.01)
*G06K 9/46* (2006.01)
*G06K 9/62* (2006.01)

(52) U.S. Cl.
CPC ......... *G06K 9/4604* (2013.01); *G06K 9/6201* (2013.01); *G06T 7/0004* (2013.01); *G01N 2021/8809* (2013.01); *G06K 2209/19* (2013.01); *G06T 2207/30108* (2013.01); *G06T 2207/30164* (2013.01)

(58) Field of Classification Search
CPC ......... G06T 15/00; G06T 19/00; G06T 19/20; G06T 2207/30108; G06T 2207/30168; G06T 17/00; G06T 2207/30164; G06K 9/4604; G06K 9/6201; G06K 9/6202; G06K 2209/19; G01N 21/00; G01N 21/01; G01N 21/88; G01N 21/8803; G01N 21/8806; G01N 21/8851; G01N 21/94; G01N 21/9501; G01N 21/956; G01N 21/95607; G01N 2021/8461; G01N 2021/8809; G01N 2021/8835; G01N 2021/8887; G01N 2021/8883; G03F 1/0092; G03F 7/70425; G03F 7/70433; G03F 7/7045; G03F 7/70458; G03F 7/70466; G03F 7/705; G03F 7/70616; G03F 7/7065; G03F 7/70666
USPC ............... 382/100, 141, 144–150, 152, 154, 382/217–221, 325; 356/237.1, 237.2, 356/237.3, 237.4, 237.5, 238.1, 238.3, 356/239.7, 239.8; 348/125, 126, 348/128–131, 133, 134; 700/110, 121; 703/13, 14; 716/50, 51, 52, 112
See application file for complete search history.

(56) References Cited

U.S. PATENT DOCUMENTS

| | | | | |
|---|---|---|---|---|
| 8,587,777 | B2* | 11/2013 | Jingu | G01N 21/956 356/237.1 |
| 8,811,712 | B2* | 8/2014 | Maeda | G06T 7/001 382/141 |
| 9,418,413 | B1* | 8/2016 | Koren | G06T 7/0004 |
| 9,518,934 | B2* | 12/2016 | Chen | G01N 21/8851 |
| 9,816,939 | B2* | 11/2017 | Duffy | G01N 21/8851 |
| 2003/0025904 | A1* | 2/2003 | Sakai | G01N 21/94 356/237.2 |
| 2004/0228515 | A1* | 11/2004 | Okabe | G06T 7/0004 382/145 |
| 2008/0040064 | A1 | 2/2008 | Ishikawa | |
| 2008/0163140 | A1* | 7/2008 | Fouquet | G03F 1/84 700/110 |
| 2008/0279444 | A1* | 11/2008 | Fischer | G01N 21/9501 382/145 |
| 2009/0290783 | A1* | 11/2009 | Sakai | G06K 9/6284 382/149 |
| 2010/0226561 | A1* | 9/2010 | Fujikawa | G06T 7/0004 382/141 |
| 2011/0261190 | A1* | 10/2011 | Nakagaki | G06T 7/001 348/126 |
| 2011/0320149 | A1* | 12/2011 | Lee | G01N 21/9501 702/83 |
| 2012/0316855 | A1* | 12/2012 | Park | G01N 21/9501 703/13 |
| 2013/0058558 | A1* | 3/2013 | Ueno | G01N 21/9501 382/144 |
| 2014/0072203 | A1* | 3/2014 | Wu | G01N 21/9501 382/149 |
| 2014/0354983 | A1* | 12/2014 | Kolchin | G01N 21/9501 356/237.5 |
| 2017/0200265 | A1* | 7/2017 | Bhaskar | G06T 7/0006 |

FOREIGN PATENT DOCUMENTS

| | | | |
|---|---|---|---|
| EP | 1413877 | | 4/2004 |
| JP | 09-026396 | | 1/1997 |
| JP | 9-49717 | | 2/1997 |
| JP | 2002-228424 | | 8/2002 |
| JP | 2006-170908 | | 6/2006 |
| JP | 2006170908 | A * | 6/2006 |
| JP | 2008-039743 | | 2/2008 |
| JP | 2010-243283 | | 10/2010 |
| JP | 2011-13227 | | 1/2011 |
| JP | 2011-237392 | | 11/2011 |
| JP | 2014-044150 | | 3/2014 |
| TW | 201506383 | | 2/2015 |
| WO | 01/98755 | | 12/2001 |
| WO | 2010/091307 | | 8/2010 |
| WO | 2012/170477 | | 12/2012 |

OTHER PUBLICATIONS

Office Action dated Jun. 12, 2018 in German Patent Application No. 102017219244.5.
Office Action dated Nov. 2, 2018 in corresponding Chinese Application No. 201711019766.4.

* cited by examiner

INSPECTION CONDITION DETERMINATION DEVICE, INSPECTION CONDITION DETERMINATION METHOD, AND INSPECTION CONDITION DETERMINATION PROGRAM

This application is based on and claims the benefit of priority from Japanese Patent Application No. 2016-215271, filed on 2 Nov. 2016, the content of which is incorporated herein by reference.

BACKGROUND OF THE INVENTION

Field of the Invention

The present invention relates to a device, a method, and a program for determining a condition for image inspection conducted to determine the presence or absence of a flaw in a target.

Related Art

According to an inspection technique conventionally employed for determining the presence or absence of a flaw in a surface, for example, of a work shaped by machining, the flaw is detected based on a difference between data about a captured image and normal data (see patent document 1, for example). An inspection device in this technique uses a camera for capturing an image of disturbance of reflected light occurring at a position of the flaw in the work illuminated with an illumination unit, and specifies the position of the flaw through image processing.

Patent Document 1: Japanese Unexamined Patent Application, Publication No. H09-49717

SUMMARY OF THE INVENTION

Regarding inspection for a flaw through image processing, the availability and the accuracy of the inspection have changed in response to a way in which the flaw appears in an image. Hence, optical conditions such as the types of illumination units, the number of the illumination units, the positions of the illumination units, etc. for making the flaw easily recognizable in the image have been required to be adjusted based on past experience or by trial and error. However, there are a variety of flaw types and the flaws occur at various positions. Hence, it has been difficult to appropriately select a optical condition available for detecting such flaws. For example, an optical condition having been adjusted by using a sample of a flaw has not always been an optimum condition. Some flaws different from the sample may not appear under this condition. Hence, inspection for a flaw through image processing has not achieved a sufficient degree of accuracy required for such inspection to become an alternative to visual inspection.

The present invention is intended to provide an inspection condition determination device, an inspection condition determination method, and an inspection condition determination program that achieve determination of an optical condition available for detecting a variety of patterns of flaws in an inspection target comprehensively in an image.

(1) An inspection condition determination device (inspection condition determination device 1 described later, for example) according to the present invention comprises: an addition unit (addition unit 11 described later, for example) that adds data mimicking a flaw assumed to occur in an inspection target to a designated position of a three-dimensional model of the inspection target; a generation unit (generation unit 12 described later, for example) that generates a first image by replicating an optical condition for capturing an image of the inspection target on the three-dimensional model, and a second image by replicating the optical condition on the three-dimensional model to which the data mimicking the flaw is added; a determination unit (determination unit 13 described later, for example) that determines whether or not a difference between the first image and the second image at the designated position exceeds a threshold that allows detection of the flaw in the inspection target; and an extraction unit (extraction unit 14 described later, for example) that extracts an optical condition available for detecting flaws of multiple designated patterns from multiple optical conditions each being the replicated optical condition.

(2) in the inspection condition determination device described in (1), the optical condition may include the position of the inspection target, that of an illumination unit, and that of a camera relative to each other.

(3) In the inspection condition determination device described in (1) or (2), the optical condition may include the shape of an illumination unit, and the characteristics of light to be emitted from the illumination unit to the inspection target.

(4) in the inspection condition determination device described in any one of (1) to (3), the optical condition may include the type of a camera lens.

(5) in the inspection condition determination device described in any one of (1) to (4), the extraction unit may extract a combination including optical conditions available for detecting the flaws of all the multiple patterns.

(6) In the inspection condition determination device described in (5), for the optical condition extraction, the extraction unit may give priority to a combination including a smaller number of optical conditions among combinations including optical conditions available for detecting the flaws of all the multiple patterns.

(7) in the inspection condition determination device described in any one of (1) to (6), the extraction unit may extract single optical conditions sequentially available for detecting flaws of more patterns undetectable under already extracted optical conditions.

(8) In the inspection condition determination device described in any one of (1) to (7), the extraction unit may extract multiple optical conditions in a group available for detecting a common flaw.

(9) In the inspection condition determination device described in (8), the group may include optical conditions which differ from each other only in the value of a first parameter, and the extraction unit may output a successive range for the value of the first parameter.

(10) In the inspection condition determination device described in (9), the value of a second parameter contained in the optical conditions may differ between the multiple groups, and the extraction unit may output a common range for the value of the first parameter among the multiple groups.

(11) An inspection condition determination method according to the present invention is implemented by a computer. The method comprises: an addition step of adding data mimicking a flaw assumed to occur in an inspection target to a designated position of a three-dimensional model of the inspection target; a generation step of generating a first image by replicating an optical condition for capturing an image of the inspection target on the three-dimensional model, and a second image by replicating the optical condition on the three-dimensional model to which the data mimicking the flaw is added; a determination step of determining whether or not a difference between the first image and the second image at the designated position exceeds a threshold that allows detection of the flaw in the inspection target; and an extraction step of extracting an optical condition available for detecting flaws of multiple designated patterns from multiple optical conditions each being the replicated optical condition.

(12) An inspection condition determination program according to the present invention causes a computer to execute: an addition step of adding data mimicking a flaw assumed to occur in an inspection target to a designated position of a three-dimensional model of the inspection target; a generation step of generating a first image by replicating an optical condition for capturing an image of the inspection target on the three-dimensional model, and a second image by replicating the optical condition on the three-dimensional model to which the data mimicking the flaw is added; a determination step of determining whether or not a difference between the first image and the second image at the designated position exceeds a threshold that allows detection of the flaw in the inspection target; and an extraction step of extracting an optical condition available for detecting flaws of multiple designated patterns from multiple optical conditions each being the replicated optical condition.

According to the present invention, an optical condition available for detecting a variety of flaw patterns comprehensively in an image can be determined.

DETAILED DESCRIPTION OF THE INVENTION

Figure 1:
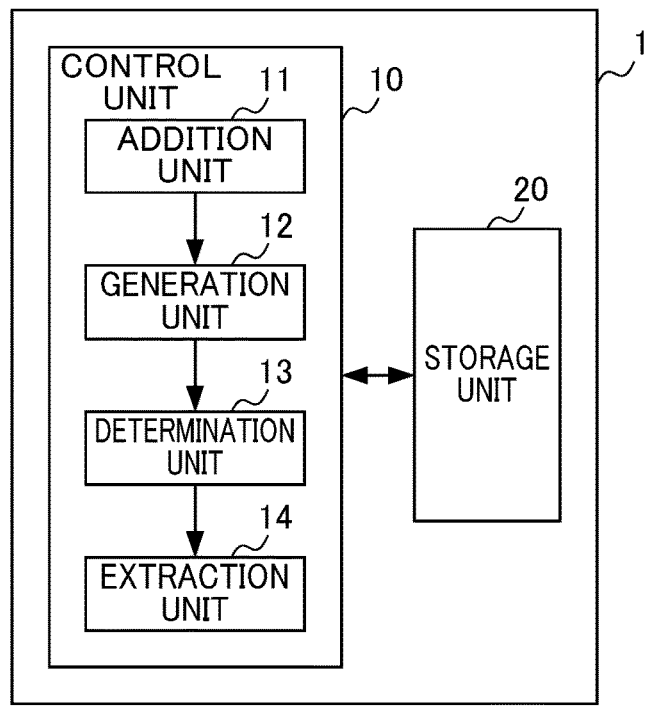
FIG. 1 shows the functional configuration of an inspection condition determination device according to an embodiment.

The following describes an embodiment of the present invention. FIG. 1 shows the functional configuration of an inspection condition determination device 1 according to this embodiment.

The inspection condition determination device 1 is an information processing device (computer) such as a PC or a server device, for example, and includes a control unit 10 and a storage unit 20. The inspection condition determination device 1 further includes a device for input and output of various types of data, a communication device, etc. The inspection condition determination device 1 has the function of performing rendering by means of computer graphics (CG) by following an input three-dimensional model and input various conditions.

The control unit 10 is a unit to control the inspection condition determination device 1 entirely. The control unit 10 reads various programs from the storage unit 20 and executes the read programs, thereby realizing various functions of this embodiment. The control unit 10 may be a CPU.

The storage unit 20 is a storage area storing the various programs, the various types of data, etc. for making a hardware group function as the inspection condition determination device 1. The storage unit 20 may be a ROM, a RAM, a flash memory, or a hard disk drive (HDD), for example. More specifically, the storage unit 20 stores an input three-dimensional model of an inspection target (work), data mimicking various flaws, various optical conditions, image data resulting from rendering, etc., in addition to a program for making the control unit 10 fulfill each of the functions of this embodiment.

The control unit 10 includes an addition unit 11, a generation unit 12, a determination unit 13, and an extraction unit 14. Each of these functional units determines an appropriate optical condition as an inspection condition available for detecting a flaw assumed to occur in a designated inspection target in an image.

The addition unit 11 adds data mimicking a flaw assumed to occur in an inspection target to a designated position of a three-dimensional model of this inspection target. The assumed flaw is a linear scratch, a dent, a scuff mark, a chip, or dirt, for example. The addition unit 11 adds data mimicking multiple flaws to the three-dimensional model while changing parameters such as the types, positions, sizes, depths, etc. of these flaws, and stores the resultant three-dimensional model.

The generation unit 12 generates an image without a flaw (first image) by replicating an optical condition for actually capturing an image of the inspection target on the three-dimensional model, and an image with a flaw (second image) by replicating the same optical condition on the three-dimensional model to which data mimicking the flaw is added. The optical condition includes the following parameters, for example.

(1) Position of Camera and That of Inspection Target Relative to Each Other

The generation unit 12 performs rendering by changing the direction of a camera (polar coordinates) relative to an inspection target surface or the direction of an inspection target relative to the camera, in the same way as a human sees a flaw on a plane. Multiple angles from the inspection target surface are set at intervals of one degree, for example. Multiple directions of the camera are set in the same way within the inspection target surface, for example.

(2) Position of Camera and That of Illumination Unit Relative to Each Other

Light emitted from an illumination unit impinges on the inspection target. Resulting reflected light and diffused light are captured by the camera. For example, according to coaxial vertical illumination, while the optical axis of the camera and the inspection target surface are vertical to each other, light is emitted to travel parallel to the optical axis of the camera. By doing so, distortion on the inspection target surface appears on the camera in different brightness. In this way, a path for the reflected light to enter the camera differs in a manner that depends on the position of the camera and that of the illumination unit relative to each other, thereby changing the type of a detectable flaw.

(3) Position of Inspection Target and That of Illumination Unit Relative to Each Other The way how a flaw is viewed is changed, for example, by applying light from the illumination unit vertically to the inspection target surface from the front, or by applying the light at a low angle substantially parallel to the surface.

Thus, multiple angles from an angle at which the light is horizontal to the surface to an angle at which the light, is vertical to the surface are set at intervals of one degree, for example. Multiple angles of the light application are set in the same way within the inspection target surface, for example.

(4) Shape of Illumination Unit

Multiple shapes of illumination units available for actual inspection are set. These illumination units include a ring-shaped illumination unit or a dome-shaped illumination unit for applying light from the periphery of the inspection target, or a bar-shaped illumination unit for applying light from one direction.

(5) Light Characteristics

The characteristics of light such as a wavelength for facilitating visual recognition of a flaw differ in a manner that depends on the depth and the shape of the flaw, the material and the shape of the inspection target, etc. Thus, multiple settings are made in terms of each of the types of light characteristics. Examples of the characteristics include: color available for actual inspection such as red, blue, white, green, infrared, and ultraviolet; intensity; and a degree of parallelization. At this time, by designating the type of an illumination unit, the characteristics of light emitted from the illumination unit of this type may be specified.

(6) Type of Camera Lens

Multiple settings are made in terms of the focal length (angle of view) of a lens. Further, multiple lens types are set such as a macro lens and a telecentric lens, for example.

In order not to extract an unfeasible condition, the relative positions defined in each of (1) to (3) are set within a range in which the inspection target, the illumination unit, and the camera can actually be moved in real space. Multiple illumination units may be used. In this case, each of the foregoing parameters (2) to (5) is set for each of these illumination units.

The generation unit 12 generates an image without a flaw and an image with a flaw under each of multiple optical conditions in different combinations including the above-described parameters. For example, while the position of the camera and that of the inspection target relative to each other are fixed, the generation unit 12 generates an image without a flaw and an image with a flaw under each optical condition while changing the position of the illumination unit. Next, the generation unit 12 follows the same procedure while changing the type of the light unit, specifically, while changing the shape of the illumination unit and light characteristics. Further, the generation unit 12 generates an image without a flaw and an image with a flaw while tilting the camera to a given degree (one degree, for example) and changing the position of the illumination unit.

The determination unit 13 determines whether or not a difference between an image without a flaw and an image with a flaw at a designated position exceeds a threshold that allows detection of the flaw in the inspection target.

The extraction unit 14 extracts a combination of optical conditions available for detecting flaws of multiple designated patterns from the multiple optical conditions. For the optical condition extraction, among combinations of optical conditions available for detecting the flaws of the multiple patterns, the extraction unit 14 gives priority to a combination including fewer optical conditions. Alternatively, the extraction unit 14 may extract a combination including optical conditions, each of which is available alone for detecting flaws of more patterns.

Figure 2:
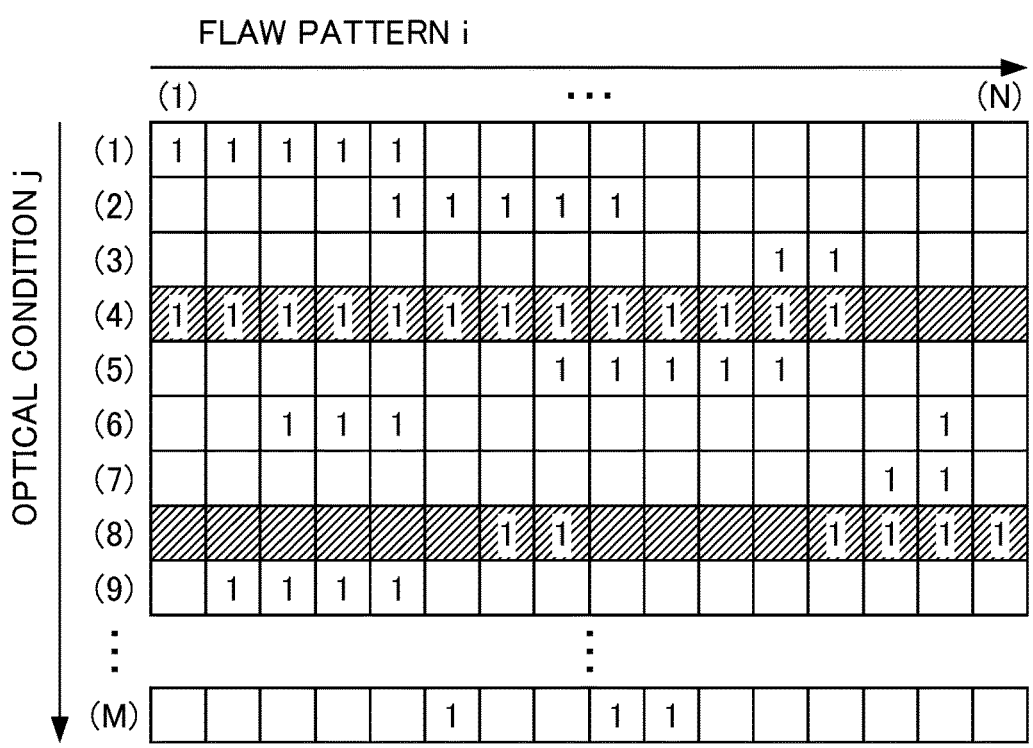
FIG. 2 illustrates a method of extracting an optical condition according to this embodiment.

FIG. 2 illustrates a method of extracting an optical condition by the extraction unit 14 according to this embodiment. In FIG. 2, flaws of multiple types added to the inspection target are each identified by an index i (i is one or more but not exceeding N). Multiple optical conditions used for generating an image with a flaw and an image without a flaw are each identified by an index j (j is one or more but not exceeding M).

If a flaw (i) is added to the inspection target and the flaw (i) can be detected through comparison between an image without a flaw captured under an optical condition (j) and an image with the flaw captured under the same optical condition (j), this case is determined as "1." If the flaw (i) cannot be detected through this comparison, this case is determined as "0" (in FIG. 2, this case is shown as blank). A two-dimensional table T (i, j) containing the case "1" and the case "0" is obtained.

Based on the table T (i, j) (i is one or more but not exceeding N, and j is one or more but not exceeding M), the extraction unit 14 is allowed to extract the following optical conditions, for example:

(a) An optical condition (j) available for detecting a particular flaw (i);

(b) A single optical condition (j) available for detecting all flaws (i) (i is one or more but not exceeding N); and (c) A group $\{j_x\}$ belonging to a group of multiple optical condition $j_1, j_2, \ldots$, and containing an element that satisfies T (i, $j_x$)=1, where i is an arbitrary value (one or more but not exceeding N).

In the example of FIG. 2, a flaw (1) can be detected under an optical condition (1) or an optical condition (4). FIG. 2 shows that there is no single optical condition available for detecting all flaws (i) (i is one or more but not exceeding N), and that all the flaws can be detected under the optical condition (4) and an optical condition (8). All the flaws can be detected by using a different combination including optical conditions (1, 2, 5, 8), for example. However, in terms of using fewer types of optical conditions or using a single optical condition available for detecting flaws of more patterns, a combination (4, 8) is selected.

Figure 3:
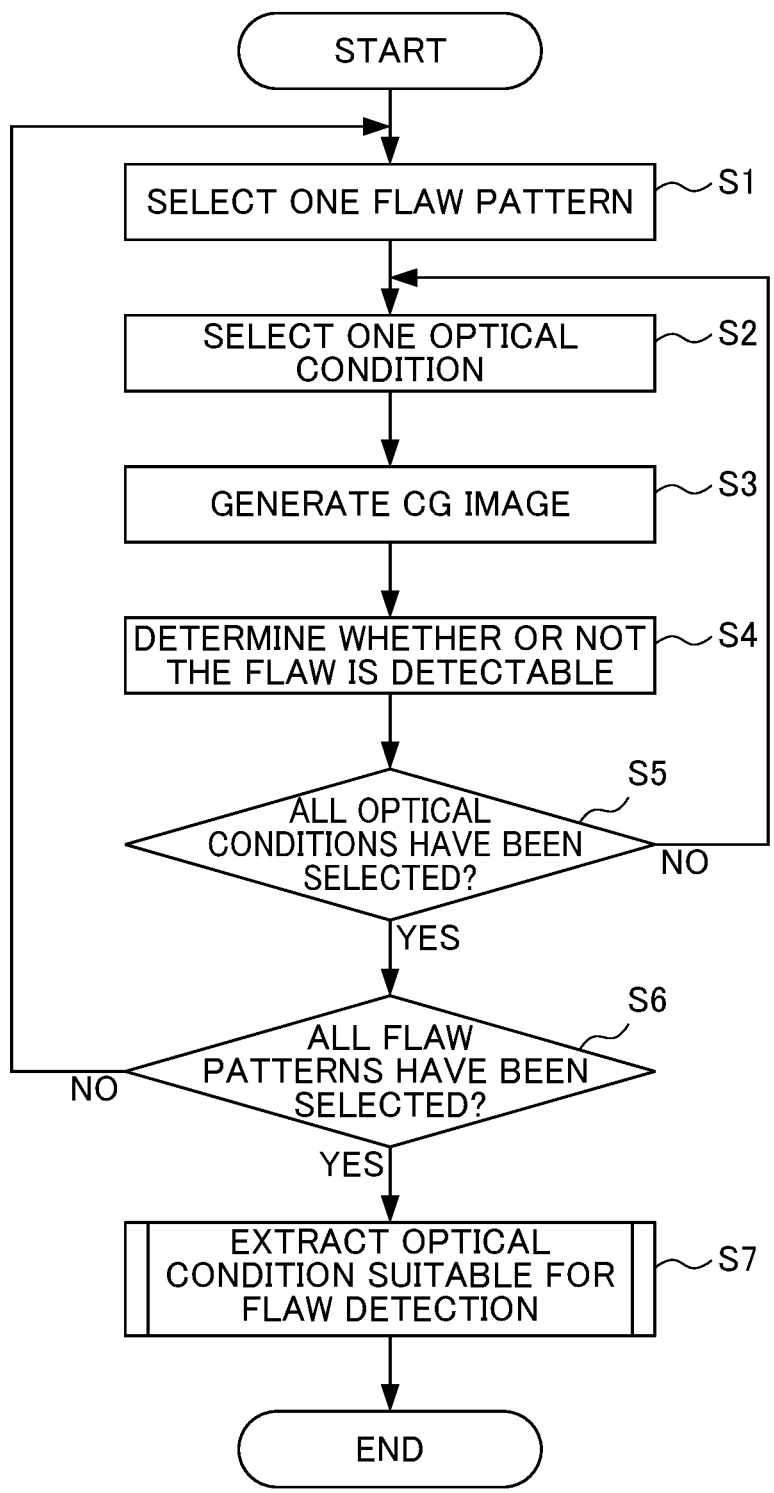
FIG. 3 is a flowchart showing an example of processing executed by following an inspection condition determination method according to this embodiment.

FIG. 3 is a flowchart showing an example of processing executed by following an inspection condition determination method according to this embodiment. In this example, priority is given to an optical condition available alone for handling more flaws.

In step S1, the control unit 10 (addition unit 11) selects one (index i: i is one or more but not exceeding N) from multiple designated patterns of flaws, and adds the selected pattern to a three-dimensional model.

In step S2, the control unit 10 (generation unit 12) selects one (index j: j is one or more but not exceeding M) from multiple designated optical conditions.

In step S3, the control unit 10 (generation unit 12) performs rendering process on the three-dimensional model based on the selected optical condition to generate CG images (an image without a flaw and an image with the flaw).

In step S4, the control unit 10 (determination unit 13) determines whether or not the selected flaw can be detected based on a difference between the generated image without a flaw and the generated image with the flaw, and stores a result of the determination.

In step S5, the control unit 10 determines whether or not all the multiple designated optical conditions have been selected. If YES, the processing shifts to step S6. If NO, the processing shifts to step S2.

In step S6, the control unit 10 determines whether or not all the multiple designated patterns of the flaws have been selected. If YES, the processing shifts to step S7. If NO, the processing shifts to step S1.

In step S7, the control unit 10 (extraction unit 14) extracts an optical condition suitable for detecting multiple flaws. An algorithm for extraction processing is not limited. The following describes a first example and a second example of the extraction processing.

Figure 4:
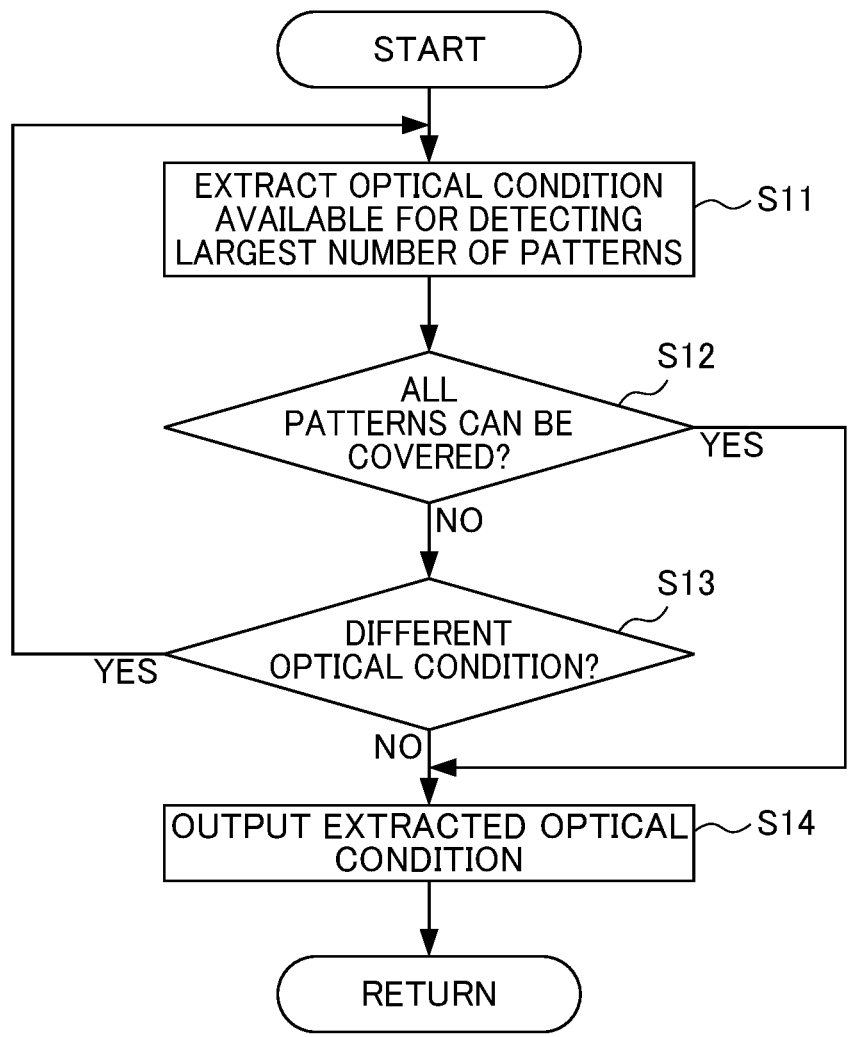
FIG. 4 is a flowchart showing a first example of processing of extracting an optical condition according to this embodiment.

FIG. 4 is a flowchart showing the first example of the processing of extracting an optical condition according to this embodiment. In step S11, the control unit 10 (extraction unit 14) extracts an optical condition available for detecting a largest number of patterns among flaws of patterns undetectable under the already extracted optical conditions.

In step S12, the control unit 10 (extraction unit 14) determines whether or not the flaws of all the patterns can be covered comprehensively by using the already extracted optical conditions. If YES, the processing shifts to step S14. If NO, the processing shifts to step S13.

In step S13, the control unit 10 (extraction unit 14) determines whether or not there is a different optical condition available for detecting a flaw yet to be handled. If YES, the processing shifts to step S11. If NO, the processing shifts to step S14.

In step S14, the control unit 10 (extraction unit 14) outputs a combination including the extracted optical conditions as an inspection condition suitable for detecting the flaws of the multiple designated patterns comprehensively.

Figure 5:
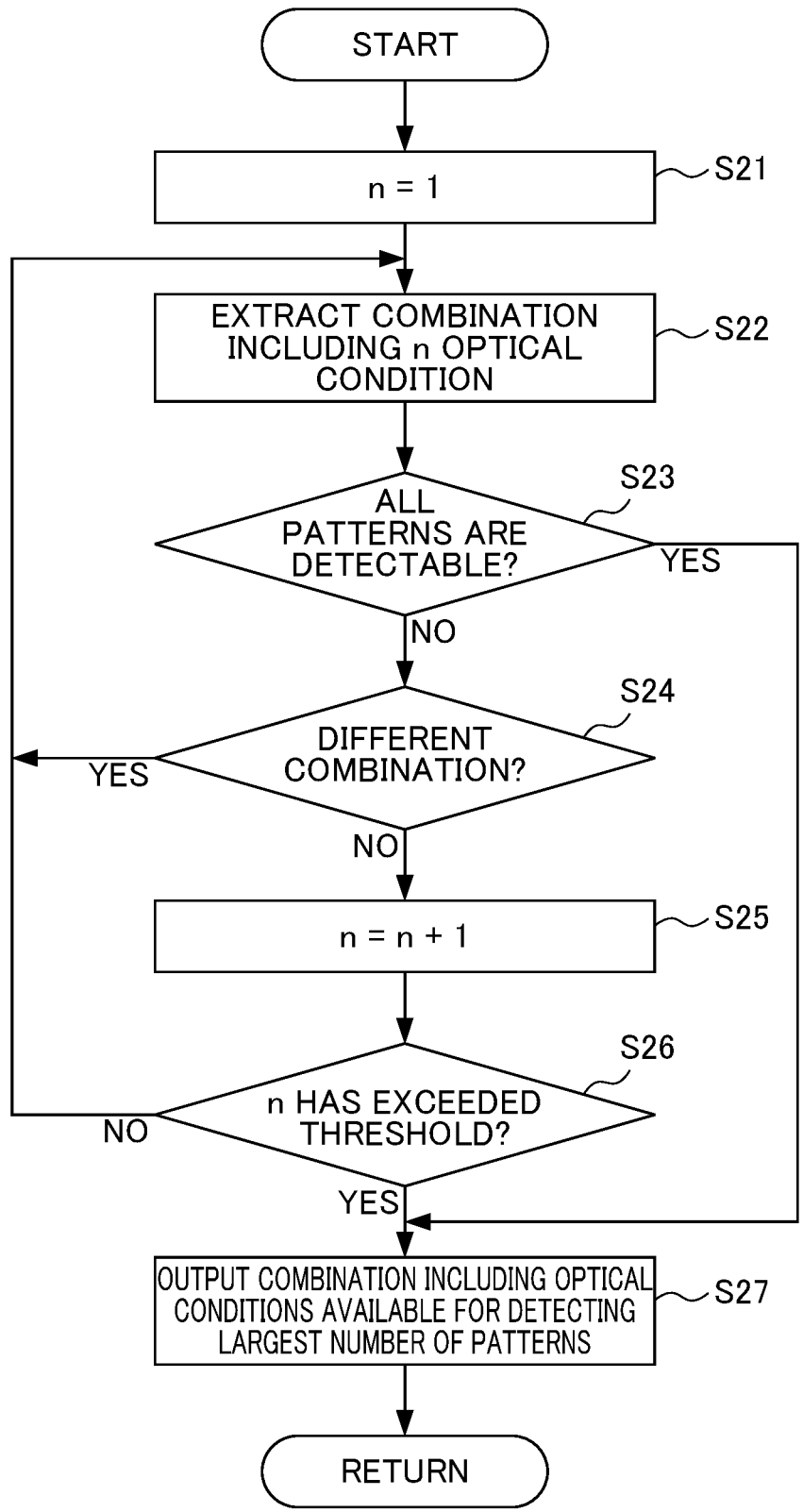
FIG. 5 is a flowchart showing a second example of the processing of extracting an optical condition according to this embodiment.

FIG. 5 is a flowchart showing the second example of the processing of extracting an optical condition according to this embodiment. In this example, priority is given to a combination including a smaller number of optical conditions available for covering all the multiple flaws comprehensively.

In step S21, the control unit 10 (extraction unit 14) initializes the number of optical conditions to be extracted to 1.

In step S22, the control unit 10 (extraction unit 14) extracts combinations sequentially each including an n optical condition from the designated optical conditions.

In step S23, the control unit 10 (extraction unit 14) determines whether or not the extracted combination including the optical conditions are available for detecting all the multiple designated patterns of the flaws. If YES, the processing shifts to step S27. If NO, the processing shifts to step S24.

In step S24, the control unit 10 (extraction unit 14) determines whether or not there is a different combination including an n optical condition. If YES, the processing shifts to step S22. If NO, the processing shifts to step S25.

In step S25, the control unit 10 (extraction unit 14) adds 1 to the number n of optical conditions to be extracted.

In step S26, the control unit 10 (extraction unit 14) determines whether or not n has exceeded a predetermined threshold, for example, a maximum number of optical conditions switchable during actual inspection. If YES, the processing shifts to step S27. If NO, the processing shifts to step S22.

In step S27, the control unit 10 (extraction unit 14) outputs a combination including optical conditions available for detecting a largest number of patterns among the flaws of the multiple designated patterns.

For output of a single optical condition or a combination including optical conditions, the extraction unit 14 desirably outputs each optical condition in a group showing a successive range for any parameter. More specifically, the extraction unit 14 forms groups of optical conditions among multiple optical conditions available for detecting a common flaw. The optical conditions in these groups differ only in the value of a first parameter contained in the multiple optical conditions. Then, the extraction unit 14 outputs a successive range for the value of the first parameter.

It is assumed, for example, that an optical condition available for detecting all flaws is found to be a combination including three parameters, a parameter in a first rank, a parameter in a fourth rank, and a parameter in a $200^{th}$ rank. It is also assumed that all the flaws can also be detected by using a combination including the three parameters, the parameter in the first rank, the parameter in a fifth rank, and the parameter in the $200^{th}$ rank, and a combination including the three parameters, the parameter in the first rank, the parameter in a sixth rank, and the parameter in the $200^{th}$ rank. In this case, a condition can be selected arbitrarily in a range for the parameter mentioned second from the fourth rank to the sixth rank. If the parameter mentioned second is the angle of an illumination unit from an inspection target surface, for example, an angle convenient for constructing an actual inspection system can be selected from this range. If the parameter mentioned second is the type of the illumination unit, an illumination unit available at lowest cost can be selected, for example.

If the extraction unit 14 forms multiple groups based on which the above-described range for the first parameter is defined and the value of a second parameter differs between these groups, the extraction unit 14 outputs a common range for the first parameter among these groups.

It is assumed, for example, that there are two parameters for optical conditions including the position of a camera and the position of an illumination unit. One hundred optical conditions are set by changing the position of the illumination unit while the camera is located at a first position. Further, it is determined that all flaws can be detected by using optical conditions from an optical condition under which the illumination unit is at a $40^{th}$ position to an optical condition under which the illumination unit is at a $60^{th}$ position. Next, it is determined that, while the camera is located at a second position, all the flaws can be detected by using optical conditions from an optical condition under which the illumination unit is at a $30^{th}$ position to an optical condition under which the illumination unit is at a $50^{th}$ position. The position of the camera and that of the illumination unit are changed in this way, thereby determining a range for the position of the illumination unit for each position of the camera available for detecting all the flaws. In this case, while the camera is located at any position from the first position to an $N^{th}$ position, the position of the illumination unit available for detecting all the flaws is output as a common range. This common range for the illumination unit is from a $42^{nd}$ position to a $48^{th}$ position, for example.

According to this embodiment, the inspection condition determination device 1 employs the CG technique to generate an image without a flaw of an inspection target and an image with a flaw to which data mimicking an assumed flaw is added by using a three-dimensional model and an optical condition. Then, the inspection condition determination device 1 determines whether the flaw can be detected by comparing these images, and extracts an optical condition available for detecting flaws of multiple designated patterns. In this way, the inspection condition determination device 1 uses the CG images to collect a variety of flaw patterns comprehensively hard to collect from an actual thing and simulates various optical conditions. As a result, the inspection condition determination device 1 is allowed to appropriately determine an optical condition available for image detection.

The optical condition can be selected from the following comprehensively in a conceivable range: the position of an inspection target, that of an illumination unit, and that of a camera relative to each other; the type of the illumination unit (shape and light characteristics); and the type of a camera lens. This allows the inspection condition determination device 1 to extract an optical condition efficiently without reliance on past experience or trial and error made by a human.

The inspection condition determination device 1 extracts a combination including optical conditions available for detecting the flaws of all the designated patterns, thereby providing a condition sufficient for inspecting the assumed flaw. Further, for the optical condition extraction, among combinations including optical conditions available for detecting the flaws of all the designated patterns, the inspection condition determination device 1 gives priority to a combination including a smaller number of optical conditions. This allows the inspection condition determination device 1 to provide efficient optical conditions to be changed less frequently during actual inspection.

The inspection condition determination device 1 extracts single optical conditions sequentially available for detecting flaws of more patterns undetectable under the already extracted optical conditions. This makes it possible to conduct inspection efficiently for determining the presence or absence of flaws of more patterns without the need of changing an optical condition during actual inspection.

If there are multiple optical conditions available for detecting the same flaw, the inspection condition determination device 1 forms a group of these optical conditions and makes an optical condition selectable from the multiple optical conditions to achieve the same effect. Further, the inspection condition determination device 1 outputs a successive range for a value adoptable for a parameter in these groups. Multiple extracted optical conditions may include a condition not convenient for actual inspection. Thus, if a user selects a condition from the output range, the selected condition can be an appropriate condition. It is not easy to replicate an output optical condition correctly for construction of an inspection system. Thus, by designating the range for the optical condition, deviation occurring in this range becomes permissible.

The inspection condition determination device 1 outputs a parameter range common between groups. By doing so, even if the second parameter is changed, a range for the first parameter still available for detecting the same flaw can be provided. For example, an inspection condition to be provided achieves the following. While the posture of the optical axis of a camera is determined in a range of 30 to 42 degrees from a posture vertical to an inspection surface, and an illumination unit makes translational movement in a range of plus or minus 20 mm while being tilted 45 degrees to the opposite side of the camera, flaws of all patterns can be detected by rotating an inspection target 360 degrees. As described above, the inspection condition determination device 1 outputs a permissible range for a condition not to change detection capability based on the extracted combinations including optical conditions, thereby facilitating application to actual inspection.

The present invention is not to be limited to the embodiment of the present invention described above. The effects described in this embodiment are merely a list of the most preferable effects resulting from the present invention. The effects achieved by the present invention are not to be limited to those described in this embodiment.

The inspection condition determination method implemented by the inspection condition determination device 1 is realized by software. To realize the inspection condition determination method by software, programs constituting this software are installed on a computer (inspection condition determination device 1). These programs may be stored in a removable medium and distributed to a user. Alternatively, these programs may be distributed to the user by being downloaded onto a computer of the user through a network.

EXPLANATION OF REFERENCE NUMERALS

1 Inspection condition determination device
10 Control unit
11 Addition unit
12 Generation unit
13 Determination unit
14 Extraction unit
20 Storage unit

What is claimed is:

1. An inspection condition determination device comprising:
   an addition unit that adds data mimicking a flaw assumed to occur in an inspection target to a designated position of a three-dimensional model of the inspection target;
   a generation unit that generates a first image by replicating an optical condition for capturing an image of the inspection target on the three-dimensional model, and a second image by replicating the optical condition on the three-dimensional model to which the data mimicking the flaw is added, the optical condition being one of a plurality of optical conditions;
   a determination unit that determines whether or not a difference between the first image and the second image at the designated position exceeds a threshold that allows detection of the flaw in the inspection target; and
   an extraction unit that extracts a combination of the plurality of optical conditions, the combination including optical conditions available for detecting flaws of all multiple designated patterns, each of the plurality of optical conditions being a replicated optical condition,
   wherein each of the plurality of optical conditions includes at least one parameter, and
   wherein the extraction unit extracts single optical conditions sequentially available for detecting flaws of more patterns undetectable under already extracted optical conditions.

2. The inspection condition determination device according to claim 1,
   wherein the at least one parameter of at least one of the optical conditions includes a position of the inspection target relative to a position of an illumination unit, the position of the inspection target relative to a position of a camera, and the position of the illumination unit relative to the position of the camera.

3. The inspection condition determination device according to claim 1,
   wherein the at least one parameter of at least one of the optical conditions includes a shape of an illumination unit, and characteristics of light to be emitted from the illumination unit to the inspection target.

4. The inspection condition determination device according to claim 1, wherein the at least one parameter of at least one of the optical conditions includes a type of a camera lens.

5. The inspection condition determination device according to claim 1, wherein the extraction unit gives priority to a combination of the optical conditions including a smaller number of optical conditions among combinations including optical conditions available for detecting the flaws of all the multiple designated patterns.

6. The inspection condition determination device according to claim 1, wherein the extraction unit extracts multiple optical conditions in a group available for detecting a common flaw.

7. The inspection condition determination device according to claim 6, wherein the group includes optical conditions which differ from each other only in a value of a first parameter, and the extraction unit outputs a successive range for the value of the first parameter.

8. The inspection condition determination device according to claim 7, wherein a value of a second parameter contained in the multiple optical conditions differs between multiple groups, and the extraction unit outputs a common range in the successive range for the value of the first parameter among the multiple groups.

9. An inspection condition determination method to be implemented by a computer, comprising:
   an addition step of adding data mimicking a flaw assumed to occur in an inspection target to a designated position of a three-dimensional model of the inspection target;
   a generation step of generating a first image by replicating an optical condition for capturing an image of the inspection target on the three-dimensional model, and a second image by replicating the optical condition on the three-dimensional model to which the data mimicking the flaw is added, the optical condition being one of a plurality of optical conditions;
   a determination step of determining whether or not a difference between the first image and the second image at the designated position exceeds a threshold that allows detection of the flaw in the inspection target; and
   an extraction step of extracting a combination of the plurality of optical conditions, the combination including optical conditions available for detecting flaws of all multiple designated patterns, each of the plurality of optical conditions being a replicated optical condition,
   wherein each of the plurality of optical conditions includes at least one parameter, and
   wherein the extraction step includes extracting single optical conditions sequentially available for detecting flaws of more patterns undetectable under already extracted optical conditions.

10. A non-transitory computer-readable medium having an inspection condition determination program stored thereon for causing a computer to execute a method comprising:
   an addition step of adding data mimicking a flaw assumed to occur in an inspection target to a designated position of a three-dimensional model of the inspection target;
   a generation step of generating a first image by replicating an optical condition for capturing an image of the inspection target on the three-dimensional model, and a second image by replicating the optical condition on the three-dimensional model to which the data mimicking the flaw is added, the optical condition being one of a plurality of optical conditions;
   a determination step of determining whether or not a difference between the first image and the second image at the designated position exceeds a threshold that allows detection of the flaw in the inspection target; and
   an extraction step of extracting a combination of the plurality of optical conditions, the combination including optical conditions available for detecting flaws of all multiple designated patterns, each of the plurality of optical conditions being a replicated optical condition,
   wherein each of the plurality of optical conditions includes at least one parameter, and
   wherein the extraction step includes extracting single optical conditions sequentially available for detecting flaws of more patterns undetectable under already extracted optical conditions.

* * * * *